US007913237B2

(12) United States Patent
Acott et al.

(10) Patent No.: US 7,913,237 B2
(45) Date of Patent: Mar. 22, 2011

(54) COMPILE-TIME CODE VALIDATION BASED ON CONFIGURABLE VIRTUAL MACHINE

(75) Inventors: Troy Steven Acott, Beaverton, OR (US); Stacy Anne Monday, Battle Ground, WA (US); Larry A. Westerman, Portland, OR (US)

(73) Assignee: Ensequence, Inc., Portland, OR (US)

( * ) Notice: Subject to any disclaimer, the term of this patent is extended or adjusted under 35 U.S.C. 154(b) by 1131 days.

(21) Appl. No.: 10/928,658

(22) Filed: Aug. 26, 2004

(65) Prior Publication Data
US 2005/0081061 A1    Apr. 14, 2005

Related U.S. Application Data

(60) Provisional application No. 60/498,218, filed on Aug. 26, 2003.

(51) Int. Cl.
G06F 9/45    (2006.01)
(52) U.S. Cl. ........ 717/143; 717/140; 717/141; 717/142; 717/151
(58) Field of Classification Search .................. None
See application file for complete search history.

(56) References Cited

U.S. PATENT DOCUMENTS

| 3,955,180 | A |   | 5/1976 | Hirtle |
| 5,286,088 | A | * | 2/1994 | Taylor et al. .................. 297/353 |
| 5,347,647 | A |   | 9/1994 | Allt et al. |
| 5,432,937 | A | * | 7/1995 | Tevanian et al. .............. 717/162 |
| 5,574,927 | A |   | 11/1996 | Scantlin |
| 5,678,039 | A |   | 10/1997 | Hinks et al. |
| 5,689,684 | A |   | 11/1997 | Mulchandani et al. |
| 5,742,794 | A |   | 4/1998 | Potter |
| 5,764,956 | A |   | 6/1998 | Akahori et al. |
| 5,875,336 | A |   | 2/1999 | Dickol et al. |
| 5,892,941 | A | * | 4/1999 | Khan et al. ....................... 703/22 |
| 5,963,934 | A | * | 10/1999 | Cochrane et al. ..................... 1/1 |
| 6,075,937 | A |   | 6/2000 | Scalzi et al. |
| 6,115,550 | A |   | 9/2000 | Hunter |
| 6,141,793 | A | * | 10/2000 | Bryant et al. .................. 717/115 |
| 6,188,401 | B1 | * | 2/2001 | Peyer ............................ 715/805 |
| 6,266,754 | B1 | * | 7/2001 | Laczko et al. ................ 711/203 |
| 6,327,608 | B1 | * | 12/2001 | Dillingham ................... 709/203 |
| 6,366,876 | B1 |   | 4/2002 | Looney |
| 6,405,367 | B1 | * | 6/2002 | Bryant et al. .................. 717/115 |
| 6,732,330 | B1 | * | 5/2004 | Claussen et al. .............. 715/234 |
| 7,065,752 | B2 | * | 6/2006 | Willard .......................... 717/140 |
| 7,185,235 | B2 | * | 2/2007 | Radestock ....................... 714/47 |
| 7,210,132 | B2 | * | 4/2007 | Rivard et al. ................... 717/138 |
| 7,275,243 | B2 | * | 9/2007 | Gibbons et al. ................ 717/159 |
| 7,305,681 | B2 | * | 12/2007 | Khartabil ....................... 719/328 |
| 2001/0047394 | A1 | * | 11/2001 | Kloba et al. ................... 709/217 |
| 2002/0026637 | A1 | * | 2/2002 | Markel et al. .................... 725/37 |
| 2002/0088008 | A1 | * | 7/2002 | Markel ........................... 725/135 |
| 2004/0221319 | A1 | * | 11/2004 | Zenoni ........................... 725/132 |

OTHER PUBLICATIONS

Daniel Vaughan, "Compile-Time Validation of Composite Object Data Binding Expressions", 2009, pp. 1-5, <http://www.codeproject.com/Articles/43617/Compile-Time-Validation-of-Composite-Object-Data-B.aspx>.* Haobo Yu et al., "Embedded Software Generation from System Level Design Languages", 2004, pp. 2-7, <http://ieeexplore.ieee.org/stamp/stamp.jsp?tp=&arnumber=1337620>.*

* cited by examiner

*Primary Examiner* — Thuy Dao
*Assistant Examiner* — Hanh T Bui
(74) *Attorney, Agent, or Firm* — Marger Johnson & McCollom, P.C.

(57) ABSTRACT

The current invention describes a virtual machine designed to run on a variety of platforms of varied capabilities, and in particular describes support in the coding and development environment for assessing and managing the variation in capability and performance among the platforms.

16 Claims, 2 Drawing Sheets

| Feature | Nominal | Platform 1 | Platform 2 | Platform 3 |
|---|---|---|---|---|
| Return-path connectivity | Present | Present | Absent | Absent |
| Red remote control key | Present | Present | Absent | Absent |
| Special function A remote control key | Present | Absent | Present | Absent |
| Transparency | Graduated transparency for each palette color | Limited set of values; 0=>0, 1-64=>64, 65-128=>128, 129-192=>192, 192-255=>255 | Single semi-transparent value; 0=>0, 1-254=>128; 255=>255 | Opaque only; 0-255=>0 |
| Transparency mode | To graphics or video | To graphics or video | To graphics only | To graphics only |
| Number of active timers | 20 | 10 | 10 | 10 |
| Minimum timer period | 30 | 100 | 500 | 1000 |
| Full-color images on backplane | Yes | Yes | No | No |
| Number of backplane images | Unlimited | 1 | 0 | 0 |
| Full-color images on video plane | Yes | Yes | Yes | No |
| Number of videoplane images | Unlimited | 1 | 1 | 0 |
| Simultaneous streaming video and full-color videoplane image | No | No | Yes | No |
| Horizontal scaling of streaming video | Percentage values from 1 to 1000 inclusive | Limited range of values, 1 to 100 inclusive | Limited set of values; 1-50=>50, 51-1000=>100 | No scaling – 100 only |

FIG. 2

COMPILE-TIME CODE VALIDATION BASED ON CONFIGURABLE VIRTUAL MACHINE

CROSS-REFERENCES TO RELATED APPLICATIONS

This application claims the benefit from U.S. Provisional Patent Application No. 60/498,218 filed Aug. 26, 2003 whose contents are incorporated herein for all purposes.

BACKGROUND OF THE INVENTION

1. Field of the Invention

This invention relates to the creation and validation of software applications intended for execution by an interpretive virtual machine.

2. Description of the Prior Art

Computers and computing devices have become a ubiquitous aspect of modern life. In the 1960s and '70s, a computer was a room-sized mainframe which ran a few specialized programs for business or scientific applications. The introduction of the personal computer in the 1980s began to change the perception and use of the computer—thousands of applications were created to serve a wide variety of commercial, business, educational and entertainment functions. More recent advances in semiconductor technology allow computing power to be incorporated into an ever-expanding array of other consumer devices—telephones, automobiles, kitchen appliances, personal digital assistants, and television receivers. The current invention, while focused on the last category, has broader applicability to this range of non-traditional computational systems.

Conventional analog television broadcast is being superceded by digital encoding and broadcast. This development has several promised benefits, including greater picture fidelity and higher audio quality. A prerequisite for successful digital reception is a computing engine capable of receiving, decrypting, decoding and displaying the digitized television video and audio signals. The computation requirements for the various sub-functions are highly asymmetric—the decoding function in particular requires specialized computational hardware, but the other functions can be performed by conventional microprocessors. In fact, contemporary microprocessors are sufficiently powerful that significant surplus computational capability is available beyond the relatively simple functions of managing or performing reception, decryption and display. Accordingly, digital television receivers (often called set-top boxes or STBs) are provided with the capability for reprogramming, for executing custom applications provided to the STB via the broadcast stream or other means. In some ways, the STB is just another computer in the household available for useful or entertaining computational work.

In some very significant ways, however, the STB is unlike the typical PC. In the early days of cable, the cable box was supplied by the cable system provider, and was rented by the viewer through a monthly payment often buried in the cable bill. The viewer did not, and generally could not, purchase a cable receiver. Eventually as cable spread, televisions and video recorders began to incorporate 'cable-ready' capabilities. But as long as the cable provider was supplying the cable box, economics dictated utilizing the installed boxes as long as possible to maximize return (since maintenance was generally negligent). As digital cable becomes available, the same market dynamic is being applied.

The STB is an appliance, and like the television set it accompanies, is perceived to have a relatively long useful life. An eight-year-old computer is generally considered nearly useless—an eight-year-old television set (or cable box) is not. Computer capabilities and standards change rapidly and continuously, while television standards do not. The PC is purchased by the consumer, who shops for features and price, whereas the STB has traditionally been supplied by the cable operator, who dictates features and price. The consumer of an STB or satellite receiver is generally interested in entertainment, and has not to date been enticed by enhanced capabilities of interactivity provided by one platform versus another.

Thus an enormous economic incentive exists for the cable provider to maximize the lifetime and utility of installed STBs. As computer components and systems have become more powerful and less expensive, these capabilities have been built into newer model STBs, but legacy boxes remain in use and will continue to be supported until appropriate economic factors dictate their replacement.

The continuing utilization of legacy STBs becomes of particular relevance when considering the evolution of software languages used in digital receiver systems. In general computing, scores of software languages have been created since the first digital computers were introduced. Each had some benefit or utility which justified its development. Some languages were appropriate only to a single machine or system architecture, while others were intended to be appropriate over a broad, or universal, range of computational platforms. Languages come and go; the software community sense of what language is most useful or appropriate changes over time, and languages are not static. Today, web development uses the HTML standard, but the more recent XML standard will likely supercede HTML and become the future standard. HTML is often supplemented by additional algorithm functionality; initially this was provided by JavaScript, but various browsers also support Visual Basic, Java, and most recently .NET.

This evolution of languages is seen in the STB hardware/software arena as well. To reduce costs, cable providers fostered competition among STB manufacturers, allowing various hardware designs to support a common application language. Various application languages, commonly called middlewares, were developed, each supported by a variety of hardware configurations. Because the technology built from the bottom up, there were no standards for these middlewares, and features and capabilities varied widely. Each middleware developer created proprietary tools for coding applications, and the quality of these tools also varied widely. Learning to use the tools and to craft applications for a particular middleware required significant investment, and the cost of application development was high, even for a single middleware. Because of the disparities among the systems, each separate middleware required duplicate investment of time and effort, so that development and proliferation of interactive television (ITV) applications was slow and costly.

Recognizing these problems, industry representatives began to press for standard development languages and systems. These efforts took two directions. First, standards were developed which intended to provide interactivity on even the simplest and least capable platforms. The Multimedia Hypermedia Experts Group (MHEG) standard is an example of such a standard. However, the limited capabilities of this standard, and its arcane nature, have prevented widespread use. The second direction was to select a common development language and feature set for future platforms. The Java language is a popular medium for programming in a distributed and heterogeneous computing environment and is by its nature well suited to development for embedded systems.

Thus Java became the basis for two of these emerging ITV specifications, the Digital Video Broadcast-Multimedia Home Platform (DVB-MHP) and Open Cable Application Platform (OCAP) standards. Java source code is compiled to a common byte-code format which can be interpreted on a wide variety of platforms. By the addition of appropriate television-specific objects and functions, Java can provide a fully-featured execution vehicle for ITV applications.

The use of Java as the development and execution language does however bring significant costs. The complexity of the language requires significant memory, and acceptable levels of performance require significant computation power in the platform. Both of these requirements obviate the use of Java as a solution to the problem of legacy STBs, since memory and CPU capabilities are well below the minimum requirements, and upgrades are infeasible. Thus, while Java may unify application development for future STBs, it does not impact the problem of practical ITV application development and deployment to legacy boxes.

What is desired is a software language, with an associated development and execution environment, which can support the development of ITV applications on both legacy and future digital television platforms, which takes advantage of the variety of capabilities of these platforms without limitation to the lowest common level of service provided by all platforms. Additionally, the language and associated development tools must support display and evaluation of the developed applications and ultimately work with the potential multiplicity of target systems.

SUMMARY OF THE INVENTION

The current invention describes a virtual machine designed to run on a variety of platforms of varied capabilities, and in particular describes support in the coding and development environment for assessing and managing the variation in capability and performance among the platforms.

The foregoing and other objects, features and advantages of the invention will become more readily apparent from the following detailed description of a preferred embodiment of the invention that proceeds with reference to the accompanying drawings.

BRIEF DESCRIPTION OF THE DRAWINGS

FIG. 2 is a table showing an excerpt from the platform capability specification database implemented according to the invention.

DETAILED DESCRIPTION

Figure 1:
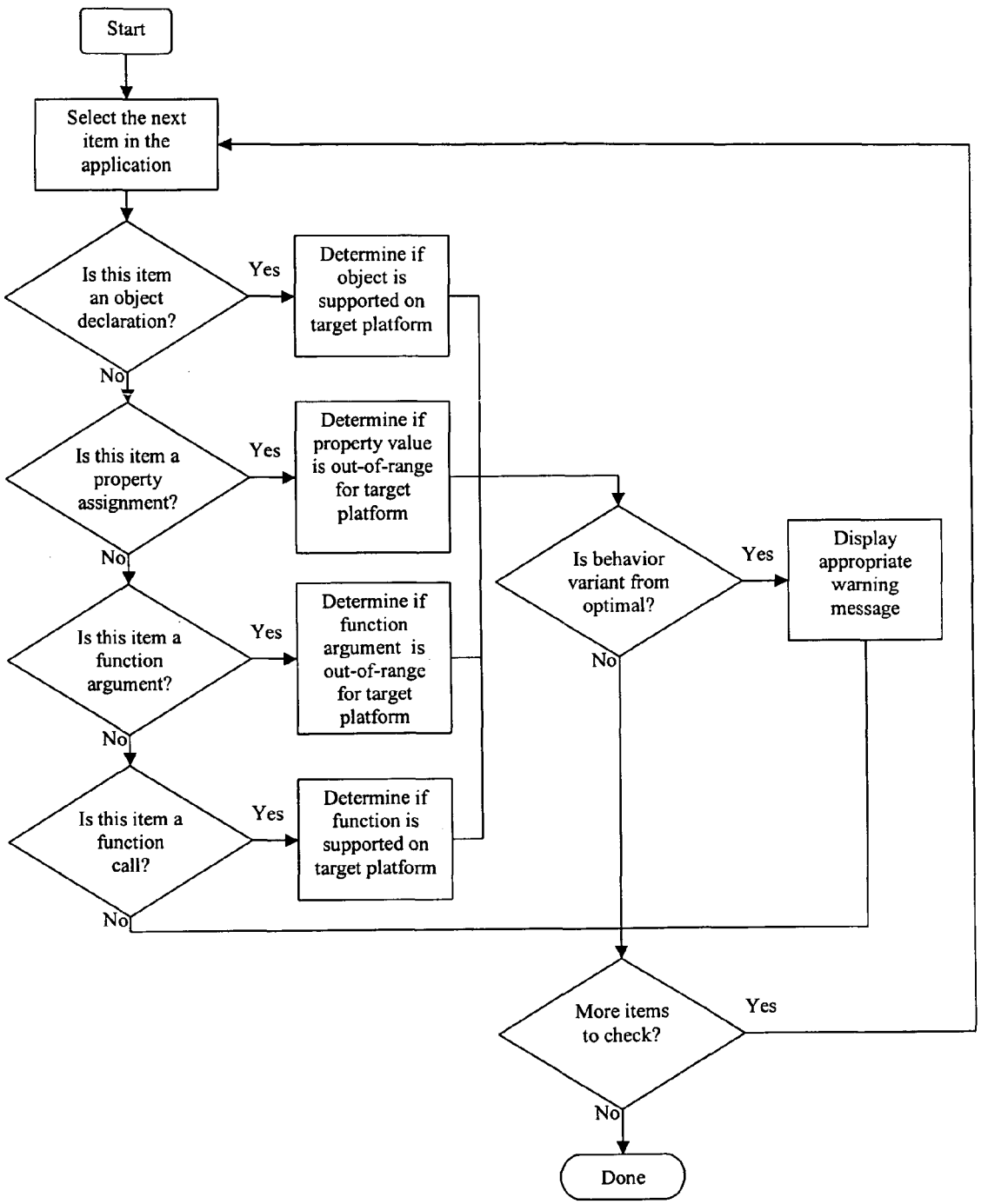
FIG. 1 is a block diagram showing processing steps for validating applications against platform-specific capabilities according to a preferred embodiment of the present invention.

The following description relates the invention to applicant's TVScript language but those knowledgeable in the art would appreciate that the invention can be expanded to work using other such computer programming languages and methods.

Assignee of the current application has approached the challenge of supporting legacy and future hardware by creating a simplified virtual machine which shares many of the benefits of the Java virtual machine, but presents a greatly-reduced set of capabilities carefully trimmed to a level appropriate to ITV applications. This virtual machine language, called TVScript, is an object-based language with a simple set of standard objects, each with properties and functions necessary for its use. The objects fall into three classes.

Organizational objects, including Global, Screen, and Overlay, provide grouping capabilities for subordinate objects.

Graphical objects, including Button, CheckBox, Image, Rectangle, TextBox, and VideoStill, provide graphical display capabilities. The StandbyAnimation and StandbyScreen objects are used in the initial stages of an application to provide immediate visual feedback during the load delay.

Functional objects provide useful functionality for the application, including IndexList, StateTable, Table, Timer, and Transaction objects.

The TVScript language specification stipulates the properties and functions associated with each of these objects; the language also includes system functions, and the option for user-defined custom functions. Functions, both pre-defined and custom, can be used as event handlers for the various viewer-and system-driven events which can occur during the execution of an application. Custom functions support a range of algorithmic capabilities for creating conditional programmatic behavior.

Because the TVScript language was intended for use on a variety of legacy systems, the specification makes specific note of the potential differences in performance among the divergent STBs on which the TVScript interpreter, called 'on-Q Client', may execute. For each of such differences, alternate behaviors are specified where appropriate. For example, the properties of the Screen object include settings for video positioning and scaling. Horizontal and vertical scaling factors can nominally be set in one-percent increments from 1 to 1000 percent inclusive. However, on any particular STB, scaling may or may not be supported; when supported, the hardware may only support a fixed set of scaling values. On such hardware systems, scaling is performed so that the actual scaling proportion is set to the supported value which is 'closest' to that set by the TVScript code.

The current invention deals with design-time support for this platform variation. A desirable feature of a development tool or environment which supports the creation of ITV applications using the TVScript language is the capability to alert the author to elements of the application which may exceed the specifications of a particular platform or set of platforms on which the application may execute. The TVScript language and the behavioral specification for on-Q Client which interprets TVScript applications specify that all valid language statements shall be executed without error on every supported platform; however, the result of execution of a statement may be a result which varies from the optimal or desired behavior of the most capable or nominal execution platform. In some cases the execution of a TVScript function or statement may result in no effect on a particular platform, although the application will continue to function in the absence of that particular aspect of TVScript functionality. For instance, the display of a graphical element which is intended to be semi-transparent, but which is actually opaque, does not constitute failure of the ITV application, but does represent a variation from the desired application behavior envisioned by the author.

To support this capability, the development tool for TVScript performs several functions in addition to the conventional tasks of a high-level language compiler. A first task is the identification of object classes which are not supported on the target platform. The prime example of this is the Transaction object, which is responsible for return-path interaction between the STB and a central server. Obviously, if the STB has no return path communication capability, this object will not serve any useful purpose in the application when executed on that STB. Note that the language specification permits such complete lack of support, with appropriate error notification, using standard event techniques, should the application attempt to make use of the functionality.

Another task is the comparison of values assigned to object properties and function arguments, to the valid range for those properties or arguments. The Java virtual machine supports runtime validation of such parameters. The on-Q Client virtual machine also performs runtime validation, for the same reasons of consistency and correctness as the Java virtual machine, but the additional step of performing such validation when possible at design time provides additional support to the application author to ensure that the desired behavior is achieved.

Still another task is to verify that object and system functions utilized in the ITV application are supported on the target platform. In some cases individual functions are not supported on the platform, or provide functionality different from the nominal behavior. While such alternate performance is within the specification of TVScript, the variation may be of significance to the author.

In all cases, this validation is performed against a database of capabilities which stipulates the variant behavior of each of a multiplicity of platforms. Since the range of STB hardware is so great, even for a single supported middleware, the database may contain entries specific to a particular software and hardware combination. For each potentially-variant aspect of on-Q Client behavior, the database contains an entry for each platform, signaling whether and how the platform behavior varies from the nominal or optimal behavior.

When using the platform validation feature, the author specifies a desired target platform from the database. The development tool then searches through the code and data for the application, determining for each item whether the application utilizes a feature or function of TVScript for which the platform exhibits variant behavior. The author is warned of each such variation, and is afforded the opportunity to modify the application code or data, or to accept the variant behavior. The flowchart shown in FIG. 1 illustrates how such testing is performed.

The platform behavior database contains a number of elements for specifying the deviation in behavior from the nominal specified behavior. Several classes of variation are described:

Absence of feature—an example is return-path communication, which renders Transaction object non-functional;

Limited valid range of values—an example is Timer.Period being limited to a one second minimum value;

Limit valid set of values—an example is horizontal scaling of video for which only actual values of 50 and 100 percent are supported; in this case, a mapping is defined from the nominal value range to the actual value range;

Limited capacity for support—an example is display of only one full-color still image at a time;

Variant support for capability—an example is exclusivity of display of streaming video and full-color still image.

FIG. 2 shows an excerpt from the platform variation database which depicts these types of platform data, namely how three different platforms functionally compare over various criteria against a nominal platform.

An important feature of the use of the platform capability database is that the author can select among the platforms in the database at any time during development, so that an application may be validated against a number of different platforms in a single work session. The structure of the validation process described in this disclosure makes such flexible validation simple, while retaining the full design power of the TVScript language.

The author may select a number of platforms simultaneously, and be presented with warnings which stipulate only the variations among those platforms for the given application. For instance, if each of a number of platforms permits only a single full-color still image to be displayed, the author may not be interested in seeing warning messages for this feature of the application. However, if one of the number of platforms does not permit full-color image display, then this fact would be highlighted to the author.

Having described and illustrated the principles of the invention in a preferred embodiment thereof, it should be apparent that the invention could be modified in arrangement and detail without departing from such principles. We claim all modifications and variation coming within the spirit and scope of the following claims.

We claim:

1. A method for testing the operation in software, during a compile process, of a target platform having a set of known capabilities, comprising:

storing in a database a list of target platforms;

associating within the database a list of capabilities of each of the target platforms including a nominal performance criteria for each of a plurality of functions required by an interactive television application, said application characterized by executable code and data, wherein the capabilities of the platforms listed in the platform behavior database comprises features taken from the following list: absence of feature, limited valid range of values, limit valid set of values, limited capacity for support, and variant support for capability;

during the compile process, searching through the executable code and data of the interactive television application and determining whether the executable code and data are semantically and syntactically correct and satisfy the nominal performance criteria for execution on the platform;

further during the compile process, when the executable code and data are semantically and syntactically correct and satisfy the nominal performance criteria for execution on the platform, searching through the executable code and data of the interactive television application and determining whether the application uses a capability for which at least one of the target platforms to be emulated includes a performance criteria that does not meet a standard required by the interactive television application; and warning a user during the compile process when the performance criteria for the at least one target platform does not meet the standard.

2. The method of claim 1, wherein the nominal performance criteria is taken from a class of variations including absence of a feature, limited valid range of values, limited valid set of values, limited capacity for support, and variant support for capability.

3. The method of claim 1, further including the step of identifying object classes which are not supported on the target platform and storing this information in the database in association with the target platform.

4. The method of claim 3, wherein the object classes include organizational objects, graphical objects, and functional objects.

5. The method of claim 1, further including the step of allowing the user to modify the application code or data, or accept the performance criteria, responsive to the warning.

6. The method of claim 1, further including embodying the functions in objects and values.

7. The method of claim 1, further including enabling a validator to allow a user to specify a desired target platform from the database, for each application intended for operation on the platform, and for determining whether the application utilizes a feature or function for which the platform exhibits variant behavior.

8. The method of claim 7, further including providing a warning of each variant behavior, and allowing the user to modify the application code or data, or to accept the variant behavior.

9. The method of claim 7, further including providing entries in the database specific to a particular software and hardware combination.

10. The method of claim 1, wherein at least one of the functions is responsible for return-path interaction between the platform and a central server interacting with the platform.

11. The method of claim 1, wherein the application is an interactive television application (ITV).

12. The method of claim 1, wherein the target platform is a legacy set top box (STB).

13. The method of claim 6, wherein the objects includes organizational objects, graphical objects, and functional objects.

14. The method of claim 13, said organizational objects taken from the group consisting of Global, Screen, and Overlay.

15. The method of claim 13, said graphical objects taken from the group consisting of Button, CheckBox, Image, Rectangle, TextBox, VideoStill, StandbyAnimation and StandbyScreen.

16. The method of claim 13, said functional objects taken from the group consisting of IndexList, StateTable, Table, Timer, and Transaction.

* * * * *